US010705412B2

(12) United States Patent
Thomas

(10) Patent No.: US 10,705,412 B2
(45) Date of Patent: Jul. 7, 2020

(54) THERMAL MANAGEMENT SYSTEM FOR 3D IMAGING SYSTEMS, OPTO-MECHANICAL ALIGNMENT MECHANISM AND FOCUSING MECHANISM FOR 3D IMAGING SYSTEMS, AND OPTICAL TRACKER FOR 3D IMAGING SYSTEMS

(71) Applicant: Seikowave, Inc., Lexington, KY (US)

(72) Inventor: Shawn E Thomas, Lexington, KY (US)

(73) Assignee: Seikowave, Inc., Lexington, KY (US)

( * ) Notice: Subject to any disclaimer, the term of this patent is extended or adjusted under 35 U.S.C. 154(b) by 0 days.

(21) Appl. No.: 15/662,276

(22) Filed: Jul. 27, 2017

(65) Prior Publication Data

US 2018/0031950 A1    Feb. 1, 2018

Related U.S. Application Data

(60) Provisional application No. 62/367,641, filed on Jul. 27, 2016.

(51) Int. Cl.
| | | |
|---|---|---|
| *H04N 7/18* | (2006.01) |
| *G03B 17/55* | (2006.01) |
| *G03B 13/32* | (2006.01) |
| *G03B 5/00* | (2006.01) |
| *H04N 13/207* | (2018.01) |
| *G03B 17/08* | (2006.01) |
| *G03B 5/02* | (2006.01) |
| *G03B 21/16* | (2006.01) |
| *G03B 13/34* | (2006.01) |

(52) U.S. Cl.
CPC ............... *G03B 17/55* (2013.01); *G03B 5/00* (2013.01); *G03B 13/32* (2013.01); *H04N 13/207* (2018.05); *G03B 5/02* (2013.01); *G03B 13/34* (2013.01); *G03B 17/08* (2013.01); *G03B 21/16* (2013.01); *H04N 2213/001* (2013.01)

(58) Field of Classification Search
CPC ................................. G03B 17/55; G03B 5/00
USPC .......................................................... 348/46
See application file for complete search history.

(56) References Cited

U.S. PATENT DOCUMENTS

| 2016/0006914 A1* | 1/2016 | Neumann ............. G06F 3/0325 348/78 |
| 2016/0276566 A1* | 9/2016 | Pirk ......................... H01L 35/30 |
| 2017/0054965 A1* | 2/2017 | Raab ..................... H04N 5/2254 |

* cited by examiner

*Primary Examiner* — Richard T Torrente
(74) *Attorney, Agent, or Firm* — Macheledt Bales LLP

(57) ABSTRACT

A multi-dimensional solution directed to a system and associated apparatus for 3-dimensional imaging system (3DIS) incorporating unique facets to adjust relative orientation and nominal focus between the primary components of the 3DIS that relies on rectification algorithms to construct 3-dimensional point clouds. The device includes a camera, camera lens assembly, projector, an auxiliary fine adjustment device for the projector, focus mount plate, mirror mount, and mirror.

16 Claims, 8 Drawing Sheets

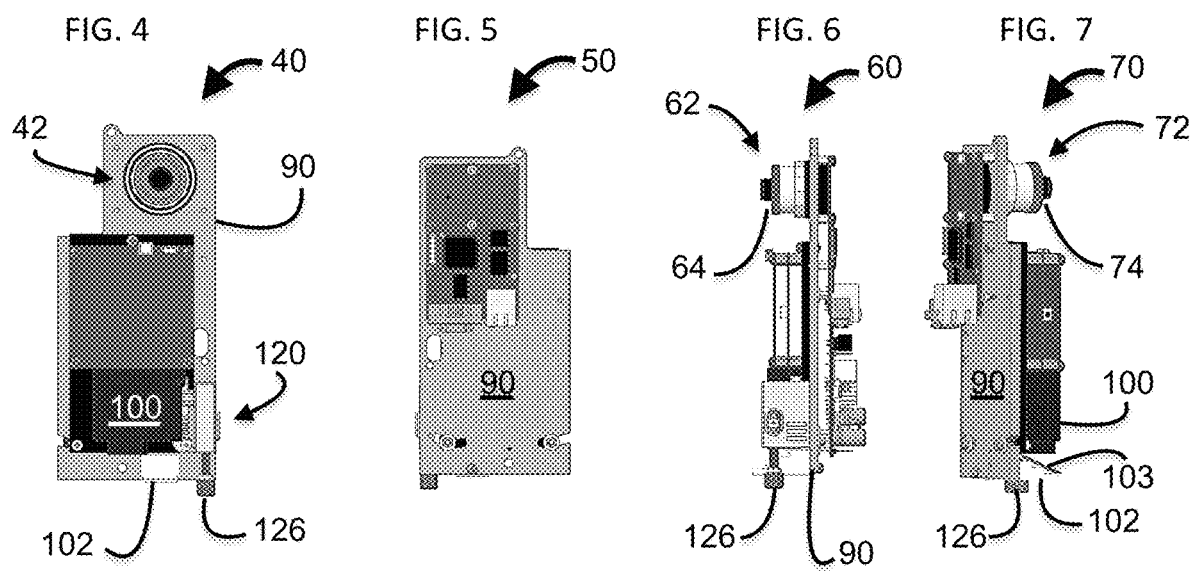
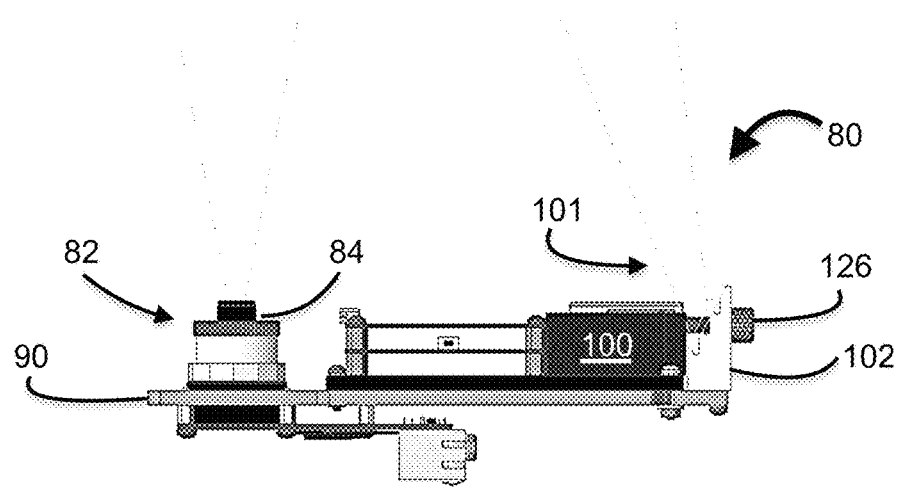

FIG. 12
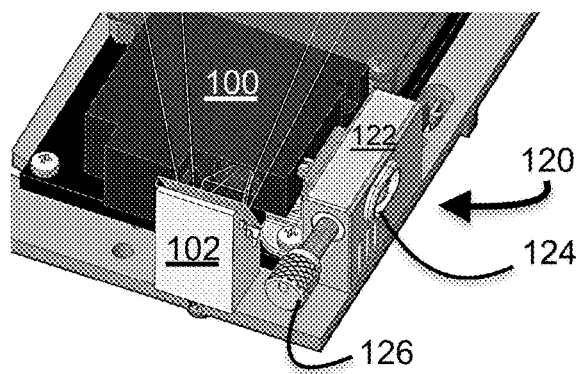
FIG. 13
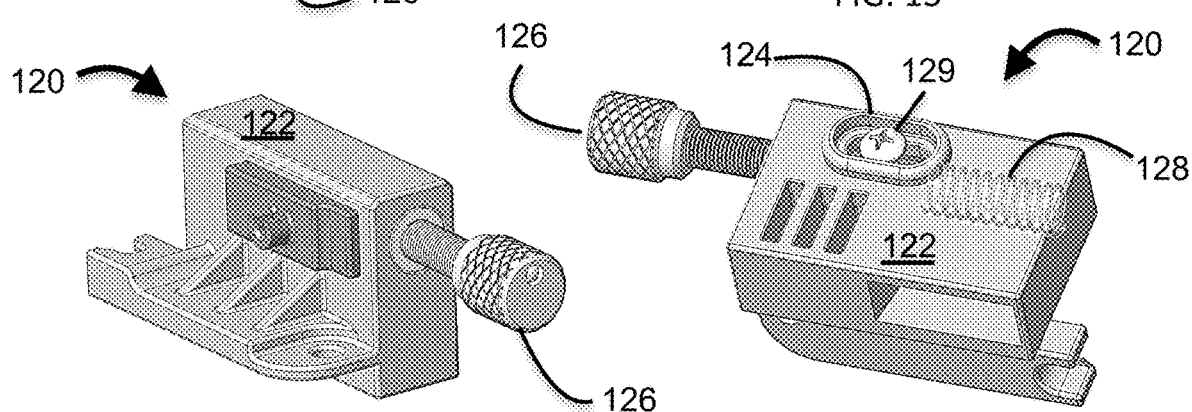
FIG. 14
FIG. 15A
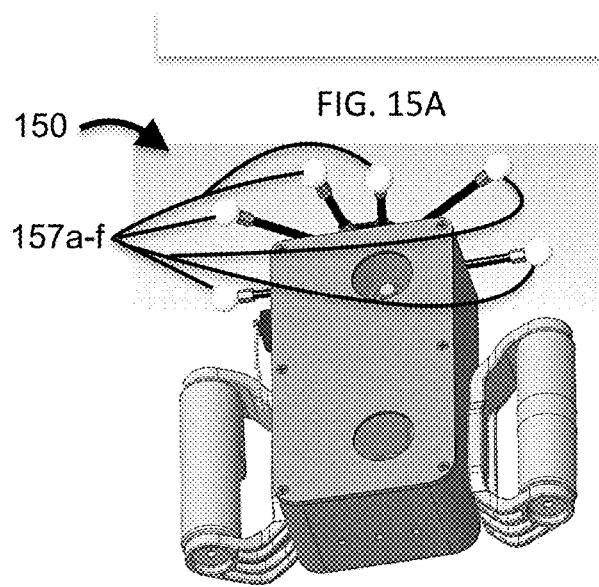
FIG. 15B
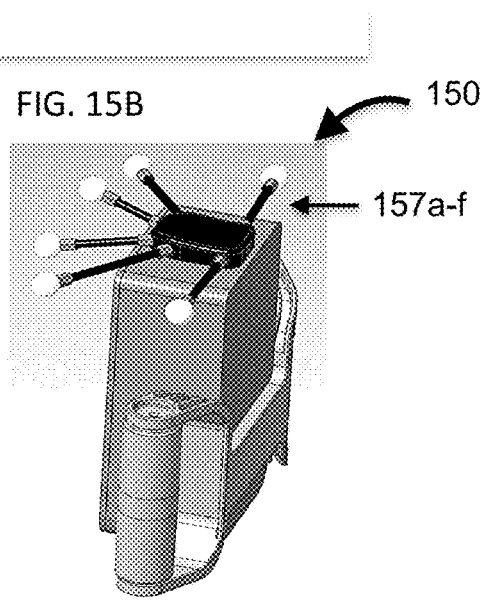

THERMAL MANAGEMENT SYSTEM FOR 3D IMAGING SYSTEMS, OPTO-MECHANICAL ALIGNMENT MECHANISM AND FOCUSING MECHANISM FOR 3D IMAGING SYSTEMS, AND OPTICAL TRACKER FOR 3D IMAGING SYSTEMS

CROSS REFERENCE TO RELATED APPLICATION(S)

This application claims benefit under 35 U.S.C. 119(e) of U.S. Provisional Application No. 62/367,641 filed 27 Jul. 2016 by the applicant and named inventors hereof, the complete disclosure of which—including examples and sketches—is incorporated herein by reference, to the extent the disclosure of the U.S. provisional application provides support and edification of this technical disclosure.

FIELD OF THE INVENTION

In general, the invention relates to 3D imaging systems ("3DIS") for which:
(I) monitoring is done to reduce thermal load of the system, lowering chance of degradation while optimizing performance;
(II) adjustment of relative orientation and focus can be problematic; and
(III) optical motion tracking (optitrack.com) might be useful.
Throughout this technical disclosure, three-dimensional may be referred to, interchangeably, as "3-dimensional" "3-D" or simply as "3D".

GENERAL BACKGROUND OF THE INVENTION

As shown and described throughout, the multi-dimensional invention is directed to unique and flexible solutions for use in
(I) thermal management of,
(II) opto-mechanical alignment and focusing of, and
(III) optical motion tracking of an object in connection with three-dimensional (interchangeably, "3-dimensional" "3-D" or "3D") imaging systems.
Background of (I): Thermal Management System for 3D Imaging Systems
More particularly, the system and associated apparatus contemplated herein for an IP67 rated 3D imaging system incorporates one or more unique facets to reduce the internal operating temperatures of 3D imaging systems that are sealed against dust and water ingress. IP67 rated devices are entirely sealed against dust ingression and water submersion to 1 meter depth, therefore, one cannot employ simple ambient-supplied forced-air convection methods to directly cool temperature sensitive components as typically seen in devices such as projectors, computers, and so on.
Background of (II): Opto-Mechanical Alignment Mechanism and Focusing Mechanism for 3D Imaging Systems
More particularly, the system and associated apparatus contemplated herein for 3D imaging system incorporates one or more unique facets to adjust relative orientation and nominal focus between the primary components of a 3D imaging system that relies on rectification algorithms to construct 3dimensional point clouds. The device includes a camera, camera lens assembly, projector, an auxiliary fine adjustment device for the projector, focus mount plate, mirror mount, and mirror.

Background of (III): Optical Tracker Integrated Housing for 3D Imaging System
More particularly, the system and associated apparatus contemplated herein for 3D imaging system incorporates one or more unique facets for optical motion tracking.

SUMMARY OF THE INVENTION

One will appreciate the distinguishable features of new systems, subassemblies, and devices supported and disclosed, herein, for achieving
(I) thermal management of 3DIS,
(II) opto-mechanical alignment and focusing of 3DIS, and
(III) optical motion tracking of an object in connection with 3DIS.

BRIEF DESCRIPTION OF DRAWINGS

For purposes of illustrating the innovative nature, plus flexibility and genius of design and versatility of the new systems, subassemblies, and devices, figures are included (in which like numerals, where included, designate like parts). One can appreciate the advantages and novel features that distinguish the instant invention from conventional or current systems, techniques, and approaches. The figures as well as any incorporated technical materials have been included to communicate features of the innovation by way of example, only, and are in no way intended to unduly limit the disclosure hereof.

FIGS. 4, 5, 6, 7, and 8 are isometric perspective diagrams (side and plan views) schematically representing alternative preferred mechanism(s) 40, 50, 60, 70, 80 adapted to aid in opto-mechanical alignment and focusing according to embodiment (II) of the invention, depicting features including: a camera 42, 62, 72, 82, camera lens assembly 64, 74, 84, projector, an auxiliary fine adjustment 120 for the projector 100, focus mount plate, mirror mount 102, and mirror 103 (also, FIGS. 10, 13, 14).

FIG. 12 is an isometric perspective assembly diagram schematically representing an auxiliary focus adjustment device 120 of the invention comprising: a body 122, a slider 124, a 100 thread-per-inch threaded bushing, a 100 threads per inch adjustment thumbscrew 126, a spring 128 and a lock screw 129.

FIG. 13, 14 are isometric perspective diagrams (views) schematically representing the auxiliary focus adjustment device 120 shown in the FIG. 12 assembly diagram. The auxiliary focus adjustment device provides greater control of the nominal projector focus by providing 6 full turns of the thumbscrew 126 to traverse the entire focus range. Once the focus position is determined, or calibrated, the set screw 129 is then locked and the thumb screw 126 is removed.

FIG. 15A, FIG. 15B are isometric perspective diagrams (views) schematically representing an 3D imaging system 150 employing attached passive optical tracking markers 157a-f in accordance with embodiment (III).

DESCRIPTION DETAILING FEATURES OF THE INVENTION (I) Thermal Management System for 3D Imaging Systems (3DIS)

FIG. 1A, 1B FIG. 1C, 1D are a series of four isometric perspective diagrams (views) schematically representing alternative preferred thermal management 3Dtb systems embodiment (I)—illustrating a copper braid feature 12a-12d leading from the thermal mount plate 14 (elsewhere, 90) to the external walls 16, 17, 18 and secured with double sided thermal transfer tape 22a-22d and copper tape 24a-24d. The system is preferably supported by EPE foam (not shown, for simplicity).

Figure 1A:
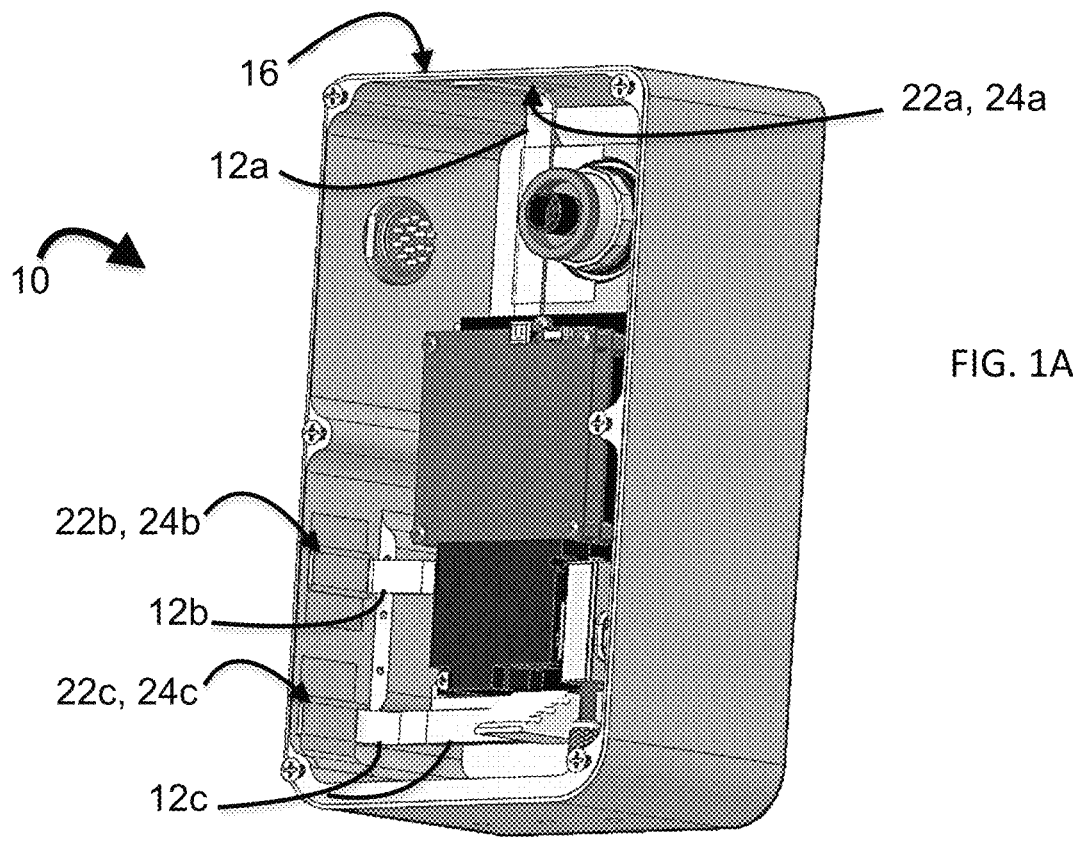
FIG. 1A, 1B FIG. 1C, 1D are a series of four isometric perspective diagrams (views) schematically representing alternative preferred thermal management 3Dtb systems 10—embodiment (I)—illustrating a copper braid feature 12a-12d leading from the thermal mount plate 14 (elsewhere, 90) to the external walls 16, 17, 18 and secured with double sided thermal transfer tape 22a-22d and copper tape 24a-24d.
Figure 1B:
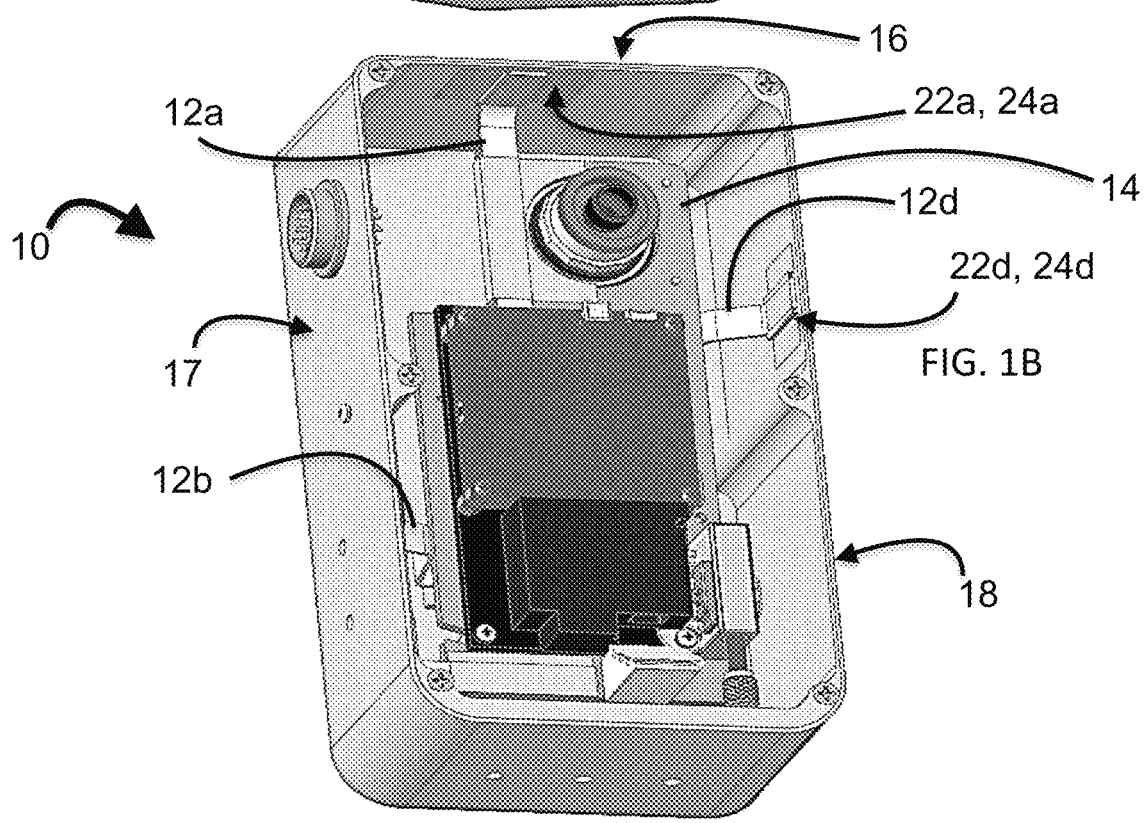
Figure 1C:
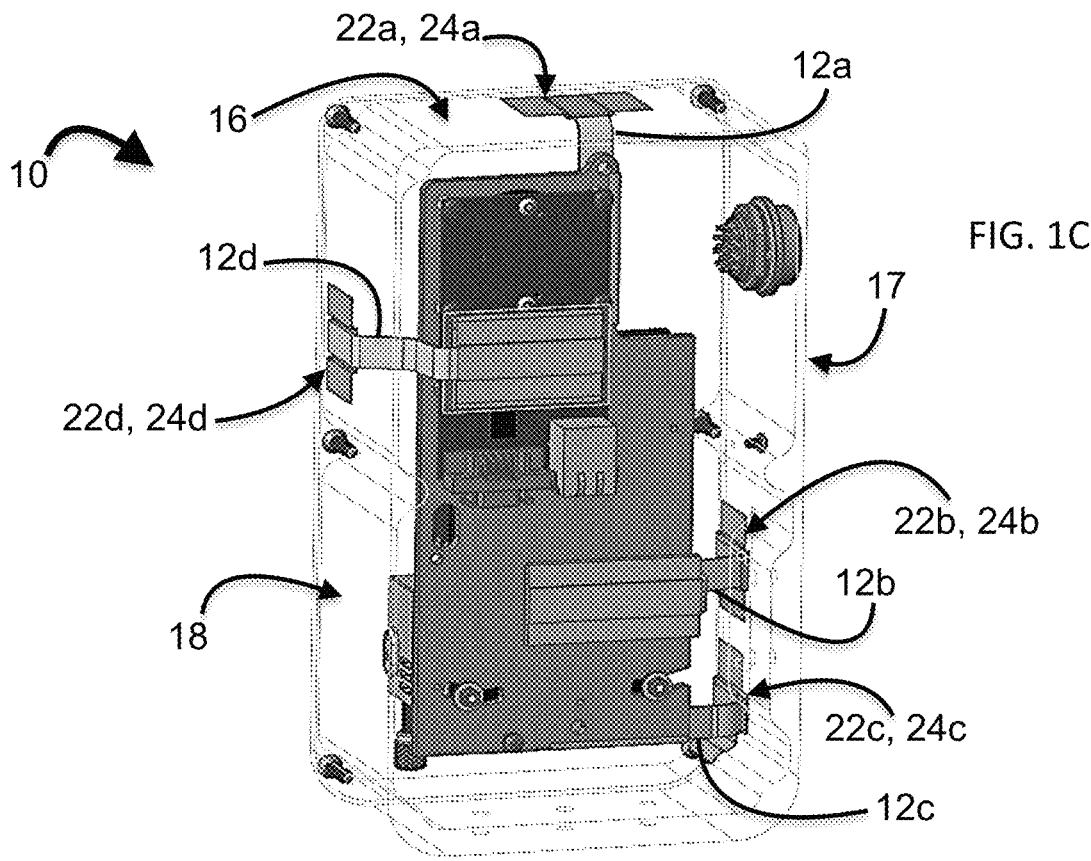
Figure 1D:
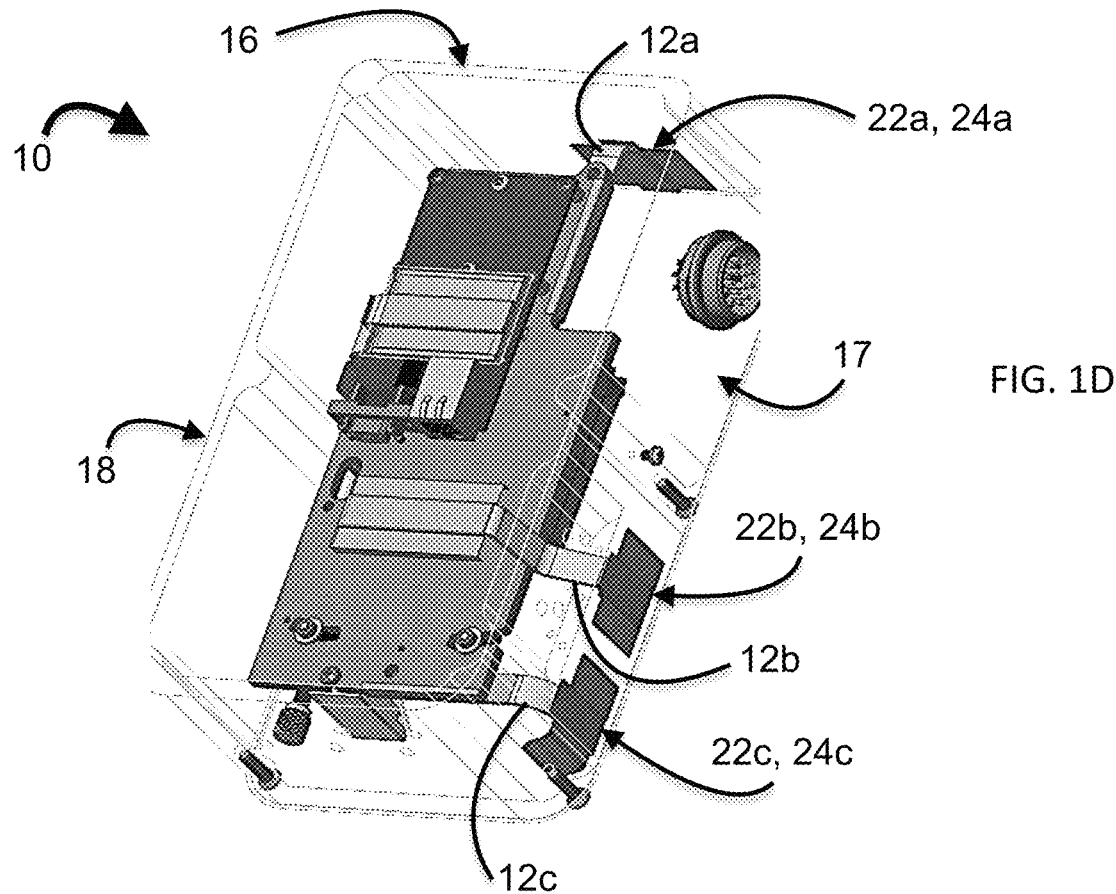
Figures 2A, 2B:
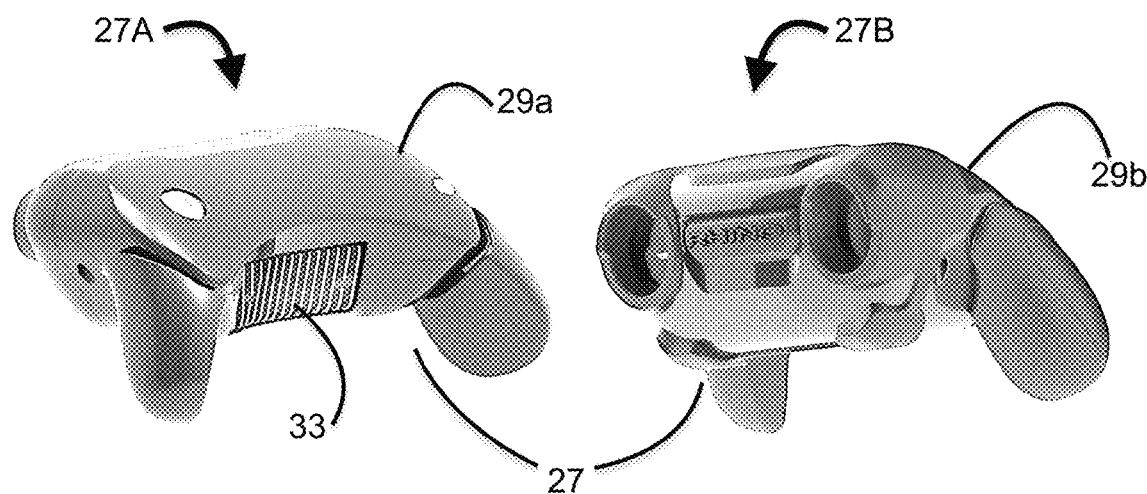
FIG. 2A, 2B are two isometric perspective diagrams (views 27A, 27B) schematically representing details of alternative preferred Rhino r01/r02 thermal management system 27.

FIG. 2A, 2B are two isometric perspective diagrams (views) schematically representing details of alternative preferred Rhino r01/r02 thermal management system 27.

Figure 3A:
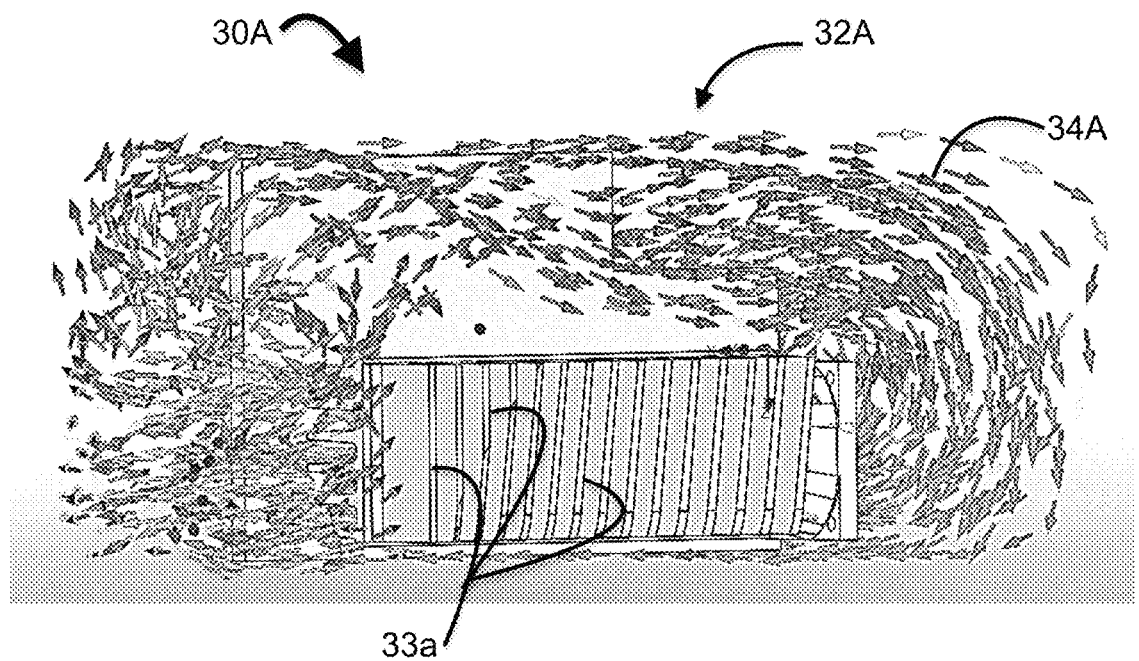
FIG. 3A, 3B, and 3C are isometric perspective diagrams (views 30A, 30B, 30C) schematically representing simplified fluid dynamics models for Rhino r01/r02 showing approximate air path 32a-c, flow rates 34a-c, and temperatures 36.
Figure 3B:
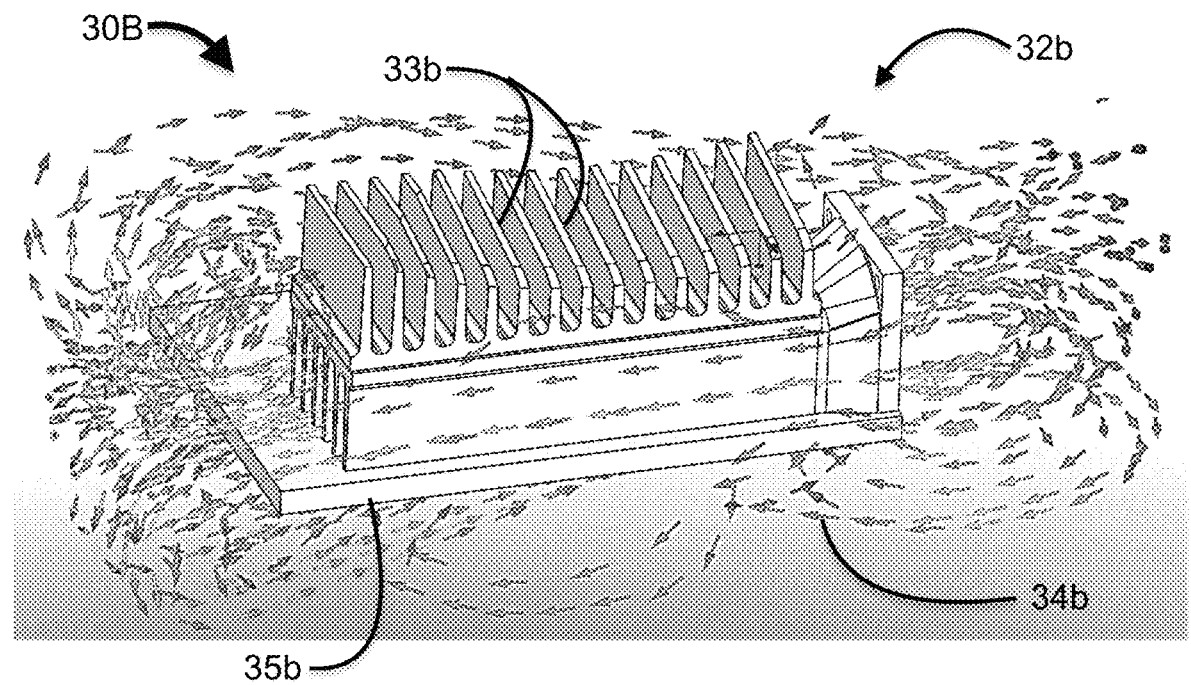
Figure 3C:
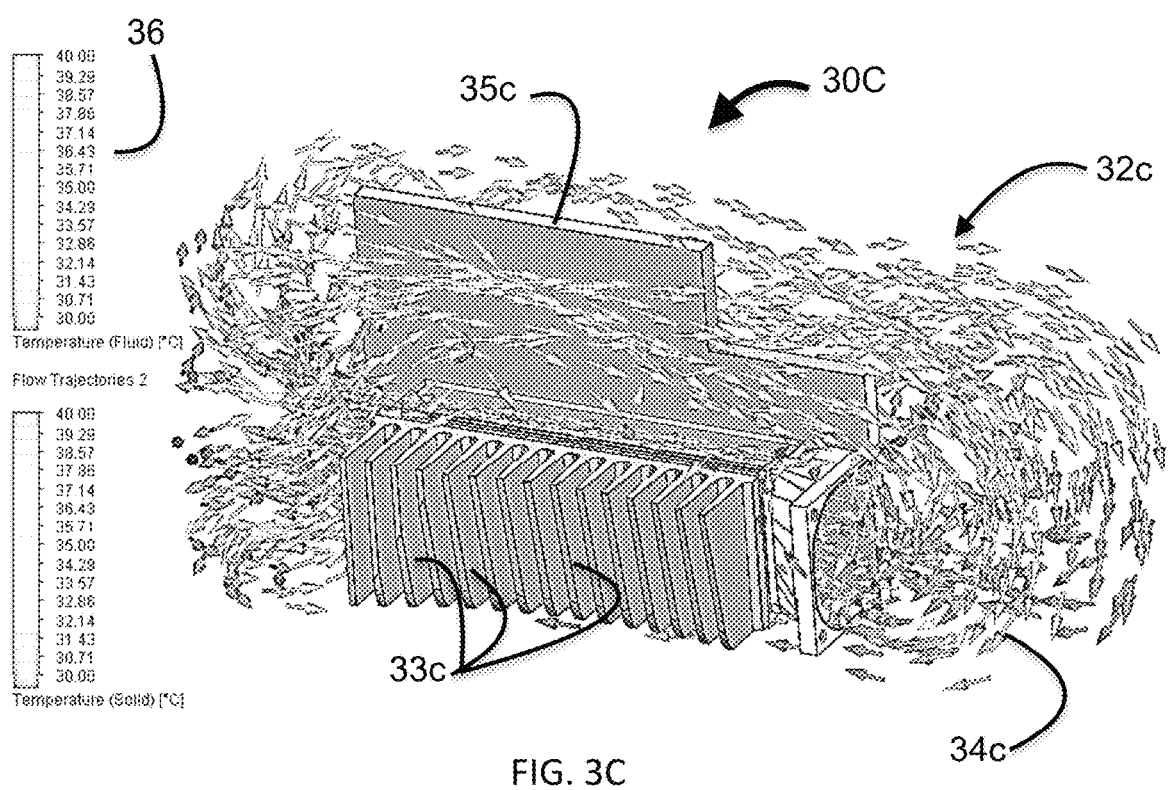
Figure 9A:
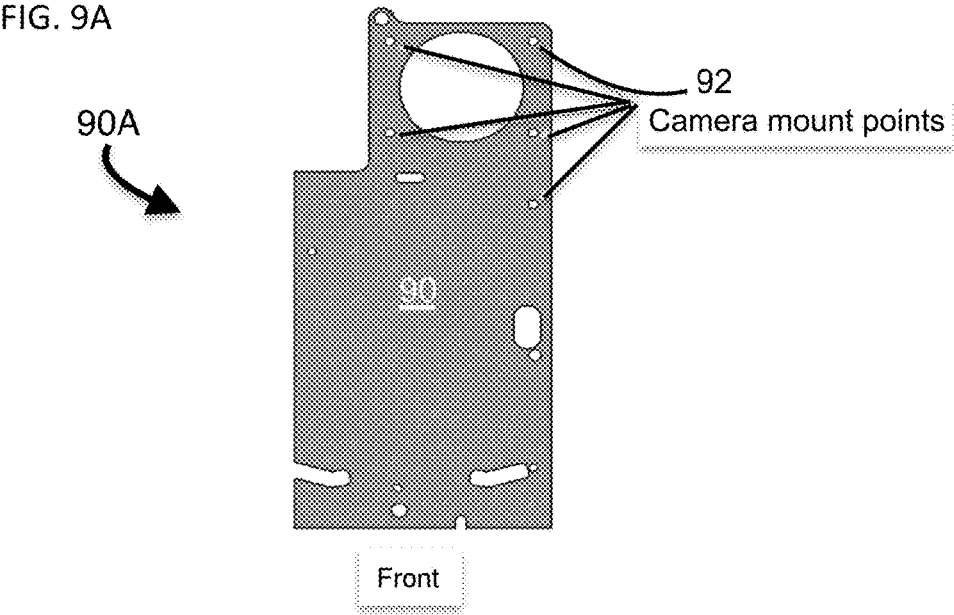
FIG. 9A, 9B, and 9C are front 90A-B and back 90C plan views of the plate feature 90 also shown in FIGS. 4-8, the plate shown with mount points 92 to locate the camera 82, FIG. 8 in a fixed position and slots 94, 96 that allow for adjustment of the projector of 6 mm of translation (94) and a rotation of 5 degrees (96) to compensate for alignment variability between the projector 100 housing and chief ray 101 (also, FIG. 10) of the projector.
Figures 9B, 9C:
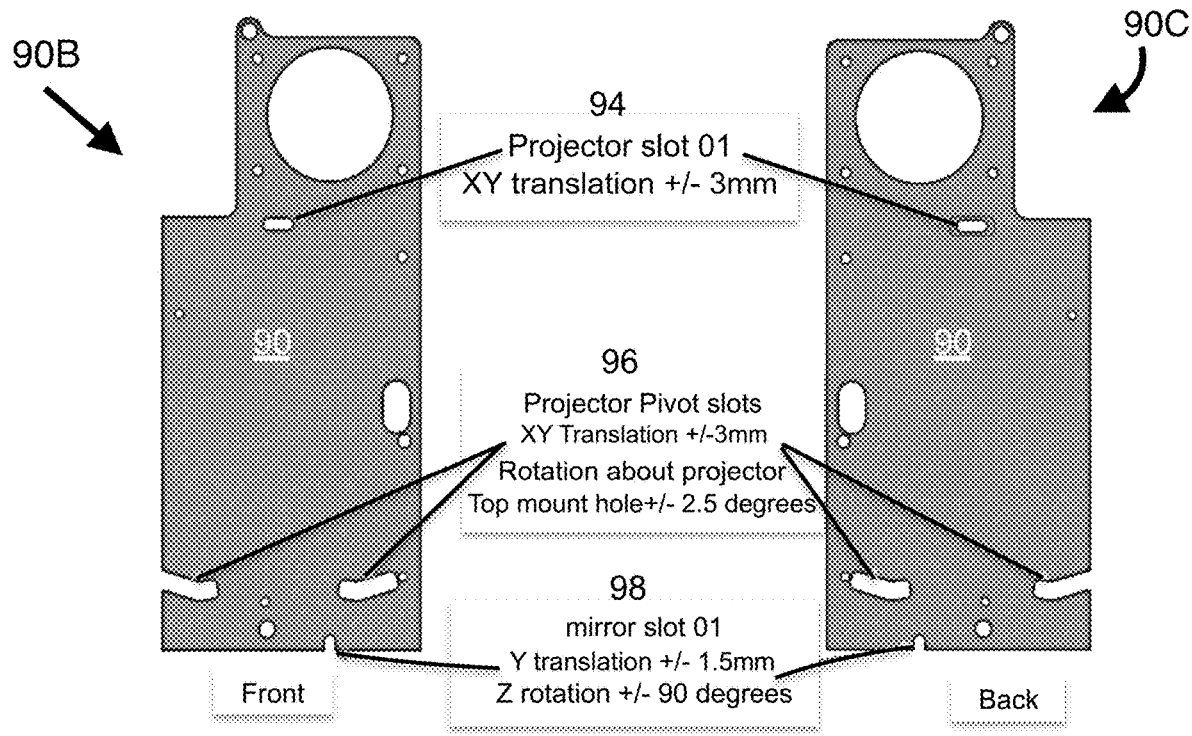

FIG. 3A, 3B, and 3C are isometric perspective diagrams (views 30A, 30B, 30C) schematically representing simplified fluid dynamics models for Rhino r01/r02 showing approximate air path, flow rates, and temperatures.

3DTB System—a Thermal Management System which Enables Drop/Impact Mitigation:

The 3DTB system takes advantage of thermal conduction from various components mounted on a cold plate to the housing's outer aluminum walls using a combination of Copper tape 24a-24d, thermal transfer tape 22a-22d, and flexible copper braid 12a-12d. The thermally conductive path utilizes copper braid to allow the internal components some freedom of movement as the internal components are mounted on a plate and suspended in an impact mitigation material such as EPE, EPP, or PU foam. A foam structure is designed to crush in order to reduce acceleration magnitudes and related forces on the internal plate mounted components. If the thermally conductive path were rigid, then any loading due to drops would transfer directly and would increase the occurrence of failures for components on the mounting plate.

2) Rhino r01/r02—a thermal management system 27 which uses a variety of internal to external thermal conveyance methods while maintaining an atmospheric seal which meets ip67 standards.

Rhino r01 and r02 utilizes an internal fan to help the electronic and other internal components reach equilibrium and maintain a lower average operating temperature inside a thermoplastic housing primarily by way of forced convection. Copper braids, heat pipes, cold plates and other thermally conductive devices and materials may be used. The fan has a circular flow path 32a-c that flows internal to the case. The flow is directed across the back of a mount plate 35b, 35c, FIGS. 3B, 3C and between one side of a 2 part (or double sided) heat-sink assembly which has heatsink fins that are in direct contact with the plate. The other side of the heatsink assembly is gasketed to the main housing about the perimeter and is in direct thermal contact with the first heat-sink. There are fins 33, FIG. 2A; 33a-c, FIGS. 3A-3C that extend to the outside of the housing 29a-b, FIGS. 2A-2B. The approach utilizes internal forced convection and conduction to convey the heat to the external heatsink which relies on natural convection and buoyancy to transfer the heat to the environment.

Avg. Thermal resistance values of >2° C./W are expected when tested at 23 C with >10 Watt internal thermal loads 3) Rhino r03/r04—an ip67 rated 3D imaging system which utilizes a primarily external forced convection cooling system for extreme thermal transfer rates while maintaining an ip67 rating for the fan enclosure a configuration similar to that used in r01/r02 in that heat generating internal components may have a multitude of materials and devices conveying thermal loads to a heatsink configuration that has one side internal to the case and one side external. In this configuration the the air path is primarily situated outside of the ip67 enclosure which protects the sensitive electronics. This is done by incorporating a high flow rate fan or blower that is rated for greater than ip67 as a standalone device. Water tight electrical pass throughs or connections are utilized. A variety of heatsinks and fan orientations may be utilized but the greatest benefit from this embodiment is that the thermal transfer rate for the entire system to atmospheric should be far greater than systems simply relying on an external natural convection heat-sink arrangement to radiate the thermal load.

The external heatsink may have a variety of configurations but is intended to utilize high flow (>0.5 m/s) and higher surface area heatsink configurations Avg. thermal resistances of <0.5° C./W are expected when tested at 23 C with >10 Watt internal thermal loads.

Additional features include:
Integrating Peltier coolers
Heatpipes to external heatsinks/fan-sinks
Add-on auxiliary cooling devices for use in high ambient temperatures
Active cooling
Cold plates
Coolant circuits (II): Opto-Mechanical Alignment Mechanism and Focusing Mechanism for 3D Imaging Systems (3DIS)

Figure 10:
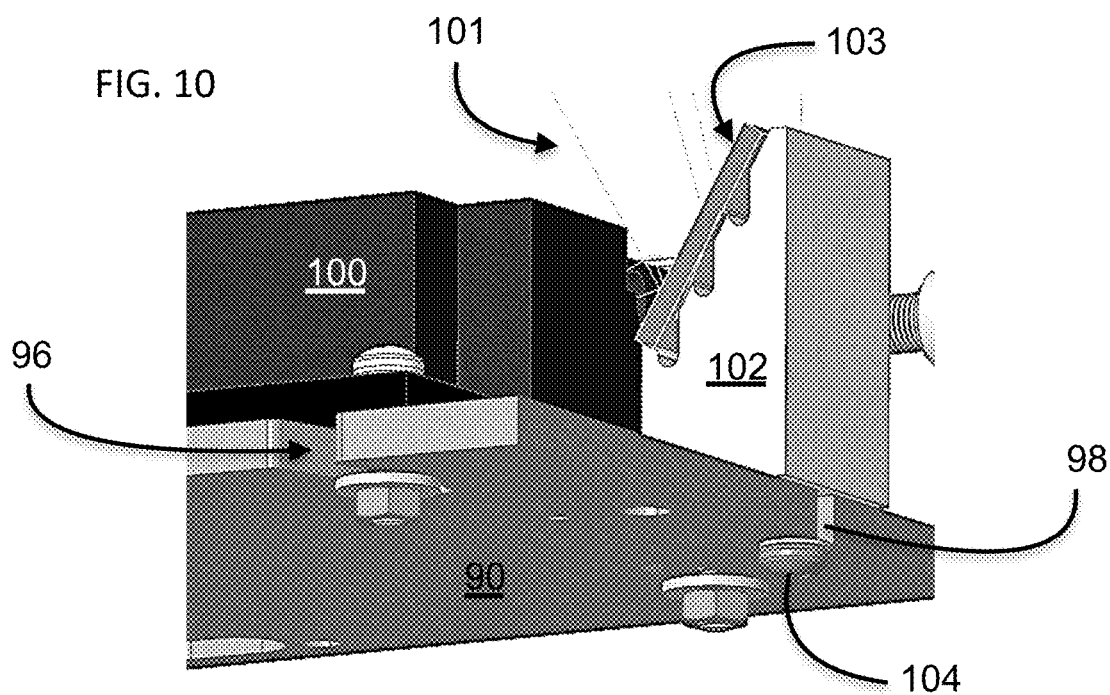
FIG. 10 is an isometric perspective diagram schematically representing a machined mirror mount 102 and screw 104 for securing and acting as rotation axis.

FIGS. 4, 5, are isometric perspective diagrams (side and plan views) schematically representing 6, 7, and 8 representing alternative preferred mechanism(s) 40, 50, 60, 70, 80 adapted to aid in opto-mechanical alignment and focusing according to embodiment (II) of the invention, depicting features including: a camera 42, 62, 72, 82, camera lens assembly 64, 74, 84, projector 100, an auxiliary fine adjustment 120 for the projector 100, focus mount plate, mirror mount 102, and mirror 103 (also, FIGS. 10, 13, 14).

FIG. 9A, 9B, and 9C FIGS. 4-8, are front and back plan views 90A-C of the plate feature 90 also shown in the plate shown with mount points 92 to locate (preferably in a fixed, rigid fashion) the camera 82, FIG. 8 in a fixed position and slots 94, 96 that allow for adjustment of the projector 100 of 6 mm of translation and a rotation of 5 degrees to compensate for alignment variability between the projector 100 housing and chief ray 101 of the projector.

FIG. 10 is an isometric perspective diagram schematically representing a machined mirror mount 102 and screw 104 for securing and acting as rotation axis.

Figure 11:
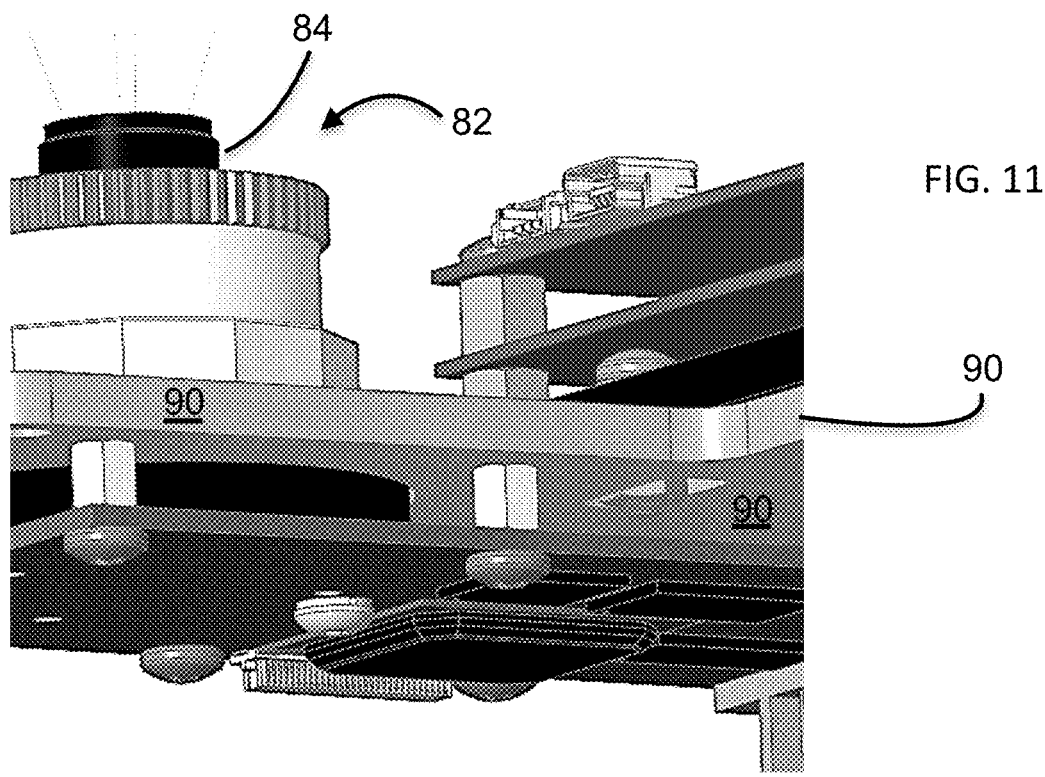
FIG. 11 is an isometric perspective diagram schematically representing a projector translation screw and lock nut.

FIG. 11 is an isometric perspective diagram schematically representing a projector translation screw and lock nut.

FIG. 12 is an isometric perspective assembly diagram schematically representing an auxiliary focus adjustment device 120 of the invention comprising: a body 122, a slider 124, a 100 thread-per-inch threaded bushing, a 100 threads per inch adjustment thumbscrew 126, a spring 128 and a lock screw 129.

FIG. 13, 14 are isometric perspective diagrams (views) schematically representing the auxiliary focus adjustment device 120 shown in the FIG. 12 assembly diagram. The auxiliary focus adjustment device provides greater control of the nominal projector focus by providing 6 full turns of the thumbscrew 126 to traverse the entire focus range. Once the focus position is determined, or calibrated, the set screw 129 is then locked and the thumb screw 126 is removed.

The system and associated apparatus contemplated herein for 3D imaging system incorporates one or more unique facets to adjust relative orientation and nominal focus between the primary components of a 3D imaging system that relies on rectification algorithms to construct 3dimensional point clouds. The device includes a camera, camera lens assembly, projector, an auxiliary fine adjustment device for the projector, focus mount plate, mirror mount, and mirror.

The plate or plate provides slots which allow for adjustment of the projector of 6 mm of translation and a rotation of 5 degrees to compensate for alignment variability between the projector housing and chief ray of the projector.

The mirror is typically epoxied in place on the face of the mirror mount block, after the rotation is set. This allows for the mirror to also be translated+/−2 mm to as needed to intersect the the projector field of view.

The camera lens assembly consists of a C-mount to m12 lens adapter and an m12 lens. The mount adapter is threaded to provide for a wide range of focus by adjusting the proximity to the image sensor The projector fine adjustment mechanism, provides for greater control of the degree of focus for the projector as supplied for the manufacturer. The manufacturer supplied mechanism adjusts from nearly infinity-to-infinity by moving a lever ~1.6 mm total. The auxiliary focus adjustment device utilizes 6 main components; a main body, a slider, a 100 thread-per-inch threaded bushing, a 100 threads per inch adjustment thumbscrew, a spring and a lock screw.

This device provides significantly greater control of the nominal projector focus by providing 6 full turns of the thumbscrew to traverse the entire focus range. Once the focus position is determined the set screw is then locked and the thumb screw is removed.

Additional Features Include:
- A rotation plate(s) for camera, projector, or both, can allow for camera or projector rotation as needed but may be combined with lift mechanisms or features such as shims, screws, actuators, motors or sliders that provide for adjustment
- Remote or on board controlling of embedded servo motors or similar mini rotational or linear actuators to provide a remote adjustment mechanism for focus and alignment
- May be used in conjunction with high accuracy encoders to report new position.
- Used in conjunction with a lookup table which would select from a series of ideal lookup tables for the new corresponding system range (providing for higher accuracy measurement for range, increased measurement range, and increased precision for a single system)
- Utilizing 3 axis rotation gimbal mechanisms or devices that provide for multiple axis of rotation at the camera and/or the projector
- Integrating any of the above methods such as adjustment slots and focus features into regions of molded thermoplastic housing components
- Incorporating actuators for both camera and projector mechanical focus in order to adjust the nominal focus range (III): Optical Tracker Integrated Housing for 3D Imaging System (3DIS)

FIG. 15A, FIG. 15B are isometric perspective diagrams (views) schematically representing an 3D imaging system 150 employing attached passive optical tracking markers 157a-f in accordance with embodiment (III).

Optical motion tracking technology such as the system employed by Optitrack (optitrack.com), in conjunction with a camera and/or light emitter utilize either active or passive "markers" or "marker constellations" to correlate the position of an object being tracked based on the known relative position of the object. In order to identify orientation of the object a marker constellation must contain individual markers having irregular or disparate distance relationships. It is important to minimize any change in those relationships.

The markers 157a-f can be spherical targets coated in reflective tape or LED's illuminating a diffuse spherical surface from the inside.

There are several options for adapting the markers 157a-f to a particular application or device. These options typically include affixing (adhere) with tape, fabric, adhesively backed plastic posts, or by securing groupings or constellations of markers which are attached to plastic frames by use similar fastening techniques.

Conventional methods become problematic when device application or usage may require a measure of durability such as the ability to withstand a drop, abrasion, liquid submersion, surface contamination by dust or dirt, or even minor impacts with objects that may change their relative positions within a constellation or the constellation's relative position to the tracked object.

Subassembly embodiments include:

1) A 3D imaging system housing which employs integrated markers 157a-f. The markers may be covered or protected to some degree by a crystalline, semi-crystalline, polymer or other material type that may be partially to fully transmittance to a range encompassing the projected source from either the tracker or emitter depending on the tracker configuration.

In a preferred embodiment the markers are partially or fully enclosed by a polymer cover that yield a useful transmittance magnitude in the ideal system range. Not limited to materials such as certain grades of polycarbonates, acrylics, and vinyl(s).

In an alternative preferred embodiment the markers are partially or fully enclosed by a semi or fully crystalline material with a useful transmittance magnitude in the ideal system range. The materials may be coated, impregnated, tinted or otherwise combined to achieve the desired wavelength, transmittance and general optical properties.

In an alternative preferred embodiment the cover material may be a material that is highly transmissive in the IR and/or NIR ranges (utilized in the Optitrack system) but partially to entirely opaque in the typical visual spectrum The markers may be active or passive with the respective optical properties of each setup.

2) A separate marker or constellation assembly housing that may be mounted to or combined with a 3D imaging system. Further detail similar detail to #1

In a preferred embodiment the markers are partially or fully enclosed by a polymer cover that yield a useful transmittance magnitude in the ideal system range. Not limited to materials such as certain grades of polycarbonates, acrylics, and vinyls.

In an alternative preferred embodiment the markers may be partially or fully enclosed by a semi- or fully-crystalline material useful transmittance magnitude in the ideal system range.

In an alternative preferred embodiment the cover material may be a material that is highly transmissive in the IR and/or NIR ranges (utilized in the Optitrack system) but partially to entirely opaque in the typical visual spectrum The markers may be active or passive with the respective optical properties of each setup. EXHIBIT A incorporated, herein, by reference has bee downloaded from optitrack.com for print on 26 Jul. 2017 for inclusion herewith as background reference, only, outlining specifications and features currently being distributed by NaturalPoint, Inc. d/b/a Opti-Track™, as noted, including markers.

EXAMPLES of the unique preferred and alternative structures and features are shown and described throughout. And, while certain representative embodiments and details have been shown for the purpose of illustrating the invention, those skilled in the art will readily appreciate that various modifications, whether specifically or expressly identified herein, may be made to these representative embodiments without departing from the novel core teachings or scope of this technical disclosure. Accordingly, all such modifications are intended to be included within the scope of the claims. Although the commonly employed preamble phrase "comprising the steps of" may be used herein, or hereafter, in a method claim, the applicants do not intend to invoke any statutory section in a manner that unduly limits rights to the claimed invention. Furthermore, in any claim that is filed herewith or hereafter, any means-plus-function clauses used are intended to cover at least all structure(s) described herein as performing the recited function and not only structural equivalents but also equivalent structures.

I claim:

1. An apparatus for 3-dimensional imaging system (3DIS) adapted for relative orientation adjustment to construct 3-dimensional point clouds, the apparatus comprising:
a camera, a camera lens assembly, a projector, an auxiliary fine adjustment device for the projector, a mount plate, a mirror mount, and a mirror;
said camera with said camera lens assembly, said projector, and said mirror mount affixed to said mount plate;
a plurality of flexible thermally conductive pathways in communication with said mount plate and at least one wall of a housing for the apparatus;
said projector, said auxiliary fine adjustment device, said mirror, and said mirror mount contained by said housing; and
a heat-sink assembly in contact with a backside of said mount plate, said heatsink assembly oriented for communication with an environment outside said housing.

2. The apparatus of claim 1 wherein each of said plurality of flexible thermally conductive pathways comprises a length of flexible copper braid, an end of which is secured to said at least one wall.

3. The apparatus of claim 1 further comprising a fan and wherein said heat-sink assembly comprises a plurality of fins arranged to aid in external thermal convection to said environment of internal thermal loads generated by said camera, said camera lens assembly, and said projector.

4. The apparatus of claim 1 wherein:
said auxiliary fine adjustment device for the projector is mechanically coupled with said projector; and
said auxiliary fine adjustment device comprises: a slider and a lock screw coupled therewith, and a threaded bushing and a thumbscrew.

5. The apparatus of claim 1 in which at least one 3-dimensional marker has been affixed and mounted to the 3-dimensional imaging system.

6. An apparatus for 3-dimensional imaging system (3DIS), comprising:
a camera with a camera lens assembly, and a projector;
said camera with said camera lens assembly and said projector affixed to a mount plate;
a heat-sink assembly in contact with a backside of said mount plate, said heatsink assembly oriented for communication with an environment outside a housing for the apparatus, said heat-sink assembly comprising an external heatsink with a plurality of fins that extend to said environment outside;
said projector and said mount plate are contained by said housing; and
a plurality of flexible thermally conductive pathways in communication with said mount plate and at least one wall of said housing for the apparatus.

7. The apparatus of claim 6 further comprising a fan and wherein said plurality of fins are arranged to aid in external thermal convection to said environment of internal thermal loads generated by said camera, said camera lens assembly, and said projector.

8. The apparatus of claim 6 wherein:
an auxiliary fine adjustment device for the projector is mechanically coupled with said projector, said auxiliary fine adjustment device affixed to said mount plate; and
said auxiliary fine adjustment device comprises: a slider and a lock screw coupled therewith, and a threaded bushing and a thumbscrew.

9. The apparatus of claim 6 further comprising:
a mirror supported by a mirror mount, said mirror mount affixed to said mount plate.

10. The apparatus of claim 9 wherein each of said plurality of flexible thermally conductive pathways comprises a length of flexible copper braid, an end of which is secured to said at least one wall.

11. The apparatus of claim 6 in which at least one 3-dimensional marker has been affixed and mounted to the 3-dimensional imaging system.

12. An apparatus for 3-dimensional imaging system (3DIS), comprising:
a camera with a camera lens assembly, a projector, an auxiliary fine adjustment device for the projector, and a mirror;
said camera with said camera lens assembly and said projector affixed to a mount plate;

a heat-sink assembly in contact with a backside of said mount plate, said heatsink assembly oriented for communication with an environment outside a housing for the apparatus;

a flexible thermally conductive pathway in communication with said mount plate and at least one wall of said housing within said area sealed-off;

wherein an internal assembly comprising said camera with said camera lens assembly, said projector, said auxiliary fine adjustment device, and said mirror are within an area sealed-off from said heat-sink assembly; and wherein said heat-sink assembly comprises a plurality of fins arranged to aid in external thermal convection to said environment of internal thermal loads generated within said area sealed-off.

13. The apparatus of claim 12 further comprising:

said mirror is supported by a mirror mount, said mirror mount affixed to said mount plate.

14. The apparatus of claim 12 further comprising a fan.

15. The apparatus of claim 12 wherein:

said auxiliary fine adjustment device for the projector is mechanically coupled with said projector; and said auxiliary fine adjustment device comprises: a slider and a lock screw coupled therewith, and a threaded bushing and a thumbscrew.

16. The apparatus of claim 12 in which at least one 3-dimensional marker has been affixed and mounted to the 3-dimensional imaging system.

\* \* \* \* \*